US008631404B2

(12) United States Patent
Laor

(10) Patent No.: US 8,631,404 B2
(45) Date of Patent: Jan. 14, 2014

(54) MECHANISM FOR DOWNLOADING HYPERVISOR UPDATES VIA A VIRTUAL HARDWARE DEVICE USING EXISTING VIRTUAL MACHINE-HOST CHANNELS

(75) Inventor: Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 503 days.

(21) Appl. No.: 12/708,311

(22) Filed: Feb. 18, 2010

(65) Prior Publication Data
US 2011/0202917 A1  Aug. 18, 2011

(51) Int. Cl.
*G06F 9/455* (2006.01)
*G06F 9/46* (2006.01)

(52) U.S. Cl.
USPC ............................................. 718/1; 718/100

(58) Field of Classification Search
USPC ................. 718/1, 104, 100; 717/171
See application file for complete search history.

(56) References Cited

U.S. PATENT DOCUMENTS

| 2007/0074199 A1* | 3/2007 | Schoenberg | 717/168 |
| 2007/0299990 A1* | 12/2007 | Ben-Yehuda et al. | 710/22 |
| 2008/0189697 A1* | 8/2008 | Kachroo et al. | 717/171 |
| 2008/0244553 A1* | 10/2008 | Cromer et al. | 717/168 |
| 2009/0313446 A1* | 12/2009 | Schuba et al. | 711/162 |
| 2010/0287544 A1* | 11/2010 | Bradfield et al. | 717/172 |
| 2011/0197256 A1* | 8/2011 | Sharkey et al. | 726/1 |

\* cited by examiner

*Primary Examiner* — Thomas Lee
*Assistant Examiner* — Phil Nguyen
(74) *Attorney, Agent, or Firm* — Lowenstein Sandler LLP

(57) ABSTRACT

A mechanism for downloading hypervisor updates using existing virtual machine (VM)-to-host channels is disclosed. A method of embodiments of the invention includes receiving one or more updates to the hypervisor from the VM via a hypervisor update component, verifying that the one or more received updates are valid, and installing the one or more received updates if the one or more received updates are valid.

20 Claims, 5 Drawing Sheets

MECHANISM FOR DOWNLOADING HYPERVISOR UPDATES VIA A VIRTUAL HARDWARE DEVICE USING EXISTING VIRTUAL MACHINE-HOST CHANNELS

TECHNICAL FIELD

The embodiments of the invention relate generally to virtualization systems and, more specifically, relate to a mechanism for downloading hypervisor updates using existing virtual machine (VM)-to-host channels.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). A host machine (e.g., computer or server) is typically enabled to simultaneously run multiple VMs, where each VM may be used by a local or remote client.

Within the host machine, a hypervisor manages allocation and virtualization of computer resources for the VMs and performs context switching, as may be necessary, to cycle between various VMs. The hypervisor allocates a certain amount of the host's resources to each of the VMs. Each VM is then able to use the allocated resources to execute applications, including operating systems known as guest operating systems. The hypervisor virtualizes the underlying hardware of the host machine or emulates hardware devices, making the use of the VM transparent to the guest operating system or the remote client that uses the VM.

Frequently, the hypervisor itself does not have an external connection to the outside network. Although users and administrators want the VMs to be connected to an external network, the hypervisor is not hooked into external public networking because it is meant to be isolated from the VM. This isolation of the hypervisor is desired for security purposes. The host machine has a network connection for the hypervisor to the internal network of the organization, but not to the outside world.

A problem encountered by the lack of connection to the external network by the hypervisor is updating the hypervisor software itself. Previous solutions ran a local update to cause the hypervisor to connect to a local update server within the internal network of the organization. This local update server would have access to the external networking in order to obtain updates to stream to the hypervisor. Unfortunately, this solution is problematic because it relies on an external additional server and typically these update servers cost additional licensing fees and other maintenance and complexity costs.

Another previous solution was to have a system administrator manually re-install a hypervisor when an update is required. Such a manual re-install is typically accomplished using a CD-ROM or USB disks. Generally, this solution is applied to ROM (read-only memory) hypervisors. ROM hypervisors operate so that every time they are updated, all software of the hypervisor is re-installed and all previous versions of the hypervisor are erased. This requires a re-boot of the hypervisor as part of upgrade process. The problem with this solution is that it is manual (i.e., time consuming) and demands a re-boot of hypervisor. This results in the disadvantage of any VMs managed by that hypervisor being unable to run in this period of time that the hypervisor is re-booting.

As a result, a mechanism to provide for downloading hypervisor updates without requiring additional hardware or manual programming would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
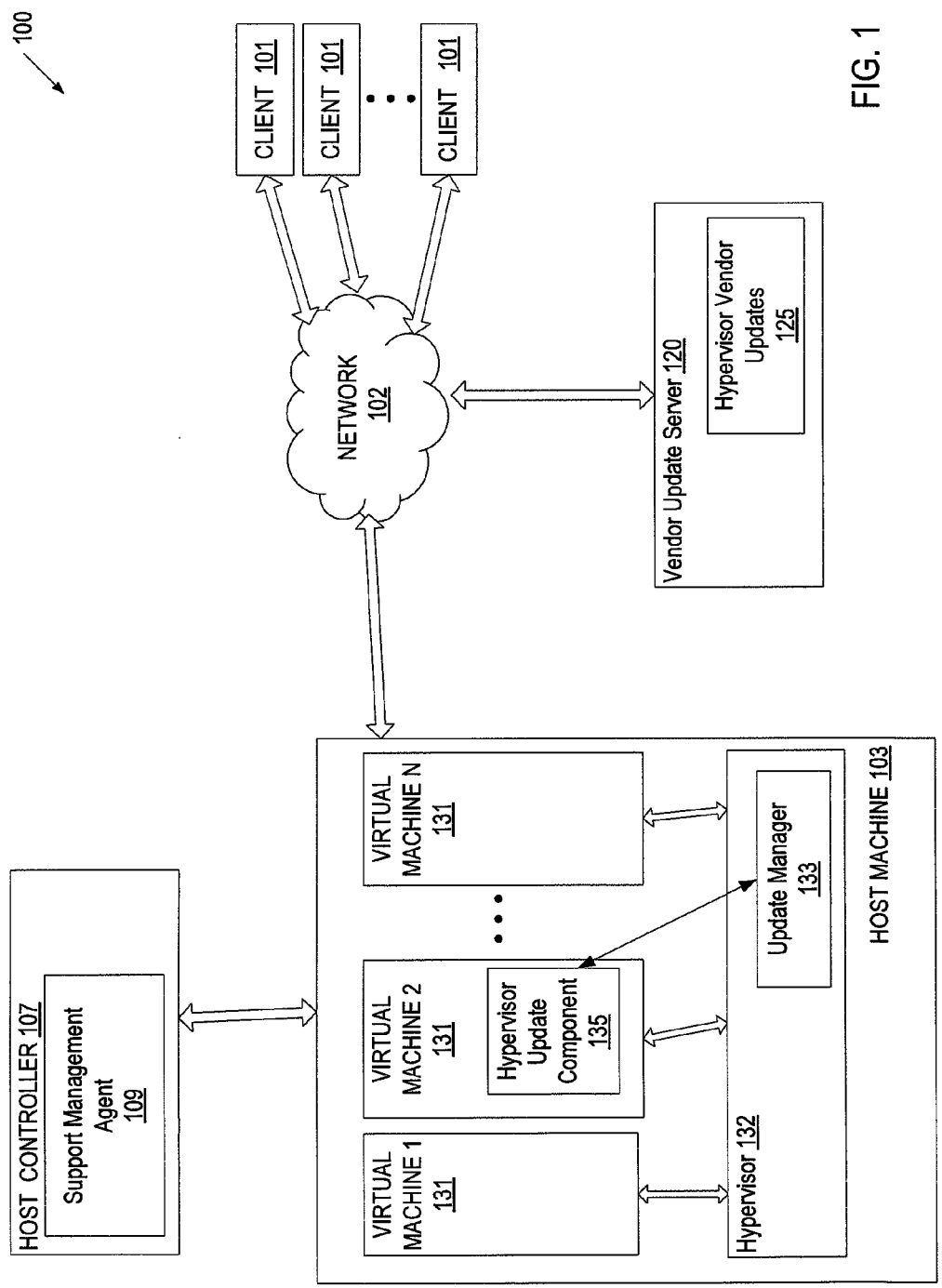
FIG. 1 is a block diagram of an exemplary network architecture in which embodiments of the present invention may operate.

Embodiments of the invention provide for downloading hypervisor updates using existing virtual machine (VM)-to-host channels. A method of embodiments of the invention includes receiving one or more updates to the hypervisor from the VM via a hypervisor update component, verifying that the one or more received updates are valid, and installing the one or more received updates if the one or more received updates are valid.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for downloading hypervisor updates using existing VM-to-host channels. Specifically, embodiments of the invention enable automatic updates to the hypervisor via one or more of the VMs managed by the hypervisor. The hypervisor installs an update component onto a VM to enable the VM to utilize its regular guest OS update function in order to obtain any needed updates for the hypervisor. Once obtained, the VM provides the updates to the hypervisor over dedicated channels between the hypervisor and VM.

FIG. 1 illustrates an exemplary network architecture 100 in which embodiments of the present invention may operate. The network architecture 100 may include a host machine 103 coupled to one or more clients 101 over a network 102. The network 102 may be a private network (e.g., a local area network (LAN), wide area network (WAN), intranet, etc.) or a public network (e.g., the Internet). In other embodiments, the host machine 103 and clients 101 may be part of the same machine. The host 103 may be coupled to a host controller 107 (via a network or directly). Alternatively, the host controller 107 may be part of the host 103.

In one embodiment, the clients 101 may include computing devices that have a wide range of processing capabilities. Some or all of the clients 101 may be thin clients, which serve as access terminals for users and depend primarily on the host 103 for processing activities. For example, the client 101 may be a desktop computer, laptop computer, cellular phone, personal digital assistant (PDA), etc. The client 101 may run client applications such as a Web browser and a graphic user interface (GUI). The client 101 may also run other client applications to receive multimedia data streams or other data sent from the host 103 and re-direct the received data to a display or other user interface.

In one embodiment, the host 103 includes a server or a cluster of servers to run one or more VMs 131. Each VM 131 runs a guest operating system (OS) that may be different from one another. The guest OS may include Microsoft Windows, Linux, Solaris, Mac OS, etc. The host 103 also includes a hypervisor 132 that emulates the underlying hardware platform for the VMs 131. The hypervisor 132 may also be known as a VM monitor (VMM), a kernel-based hypervisor or a host operating system.

Each VM 131 can be accessed by one or more of the clients 101 over the network 102. In one scenario, the VM 131 can provide a virtual desktop for the client 101. The VMs 131 can be managed by the host controller 107. The host controller 107 may also add a VM, delete a VM, balance the load on the server cluster, provide directory service to the VMs 131, and perform other management functions.

Embodiments of the invention enable automatic updates to the hypervisor 132 via one or more of the VMs 131 managed by the hypervisor 132. The hypervisor utilizes the regular guest OS of one or more of its VMs 131 to obtain any needed updates for the hypervisor 132. These updates are provided to the hypervisor 132 over dedicated channels between the hypervisor 132 and VMs 131. This update process of embodiments of the invention occurs even though the hypervisor 132 may not have an external network connection.

In one embodiment, one or more of the VMs 131 are connected externally. The hypervisor 132 then uses the VMs 131 that are able to communicate with their external update service. VMs 131 are externally connected to the Internet, and furthermore, some of the VMs' 131 OSs are connected to a vendor update server 120. Note that this update service might be the standard OS update service, for example Red Hat™ RHN service or Microsoft™ update service. Another use case is to use a specific service for updating the hypervisor 132 that is accessible through the internet. Utilizing this connection to the vendor update server 120, each VM 131 (or some previously selected VM 131) is able to obtain any necessary updates 125 for the hypervisor 132. The hypervisor vendor should already provide its VM-related content and updates to the OS vendor, and as such, will already have connections in place to all the vendors in order to provide hypervisor updates 125 to be sent to a VM 131.

In embodiments of the invention, a VM 131 may obtain an update for the hypervisor 132 if it includes a hypervisor update component 135. This hypervisor update component 135 is installed onto the VM 131 by an update manager 133 of hypervisor 132 for the purposes of identifying and obtaining updates needed for the hypervisor 132. The hypervisor update component 135 allows the update process of the VM 131 to know that a hypervisor component exists that will also need updates 125 to be provided to the VM 131.

In one embodiment, all VMs 131 managed by the hypervisor 132 may have a hypervisor update component 135 installed to enable receipt of hypervisor updates 125. However, in other embodiments, only one VM 131 or perhaps a selected few VMs 131 may be chosen to receive the hypervisor update component 135 for hypervisor updates. In some embodiments, to increase security, the update manager 133 in the hypervisor 132 could mark special VMs that it considers secure to be the single channel of hypervisor updates. For example, if the hypervisor 132 is a Microsoft™ hypervisor, the update manager 133 in the hypervisor 132 may set a requirement that a VM 131 must have a Microsoft™-based OS in order to provide hypervisor updates. In other embodiments, the update manager 133 may only select VMs 131 with both the same base OS system and a set of certain user privileges to receive hypervisor update component 135.

In one embodiment, to mark a VM 131 for selection to install the hypervisor update component 135, a simple command can be executed by the update manager 133 to set a single Boolean variable indicating that the particular VM 131 is allowed to obtain updates for the hypervisor 132. In one embodiment, a VM 131 may be marked as hypervisor update-enabled upon its creation.

In another embodiment of the invention, the hypervisor 132 presents a virtual hardware device, shown as the hypervisor update component 135 in FIG. 1, that has as its only purpose the goal to get driver updates from the update service. The updates are device driver code, but they only contain hypervisor updates. Once the updates to the virtual hardware device, and therefore the hypervisor, are received by the VMs 131, the VM OS installs them as a new driver in the OS. On installation, the driver sends the accepted update code to the hypervisor update manager 133 via the established channel between the VM 131 and the hypervisor 132.

In one embodiment, the hypervisor could expose its version to the hypervisor update component 135 of the VM 131 selected for obtaining hypervisor updates, and thereby instruct the VM 131 that it only needs updates for this version and higher. Such an arrangement prevents the VM 131 from sending needless updates to the hypervisor 132. Once the hypervisor updates 125 reach the VM 131, the VM forwards these updates through a special channel into the hypervisor. Typically, each hypervisor 132 includes these special dedicated channels for various types of communication with each VM 131.

With proper encryption and signing, the fact that VMs 131 provide updates to the hypervisor 132 should be safe. Updates 125 are specifically signed so that unsecured software cannot be installed on the hypervisor 132. In one embodiment, the hypervisor 132 checks the digital signature of all updates 125 it receives upon receipt of the update in order to determine if the update is signed correctly. If the update is signed correctly, then the hypervisor 132 proceeds to install the update In some cases, a reboot is required depending on the component being update. For example, if the hypervisor kernel is being updated, a reboot is required. On the other hand, if the update is for one of the hypervisor userspace daemons, then no reboot is needed.

Figure 2:
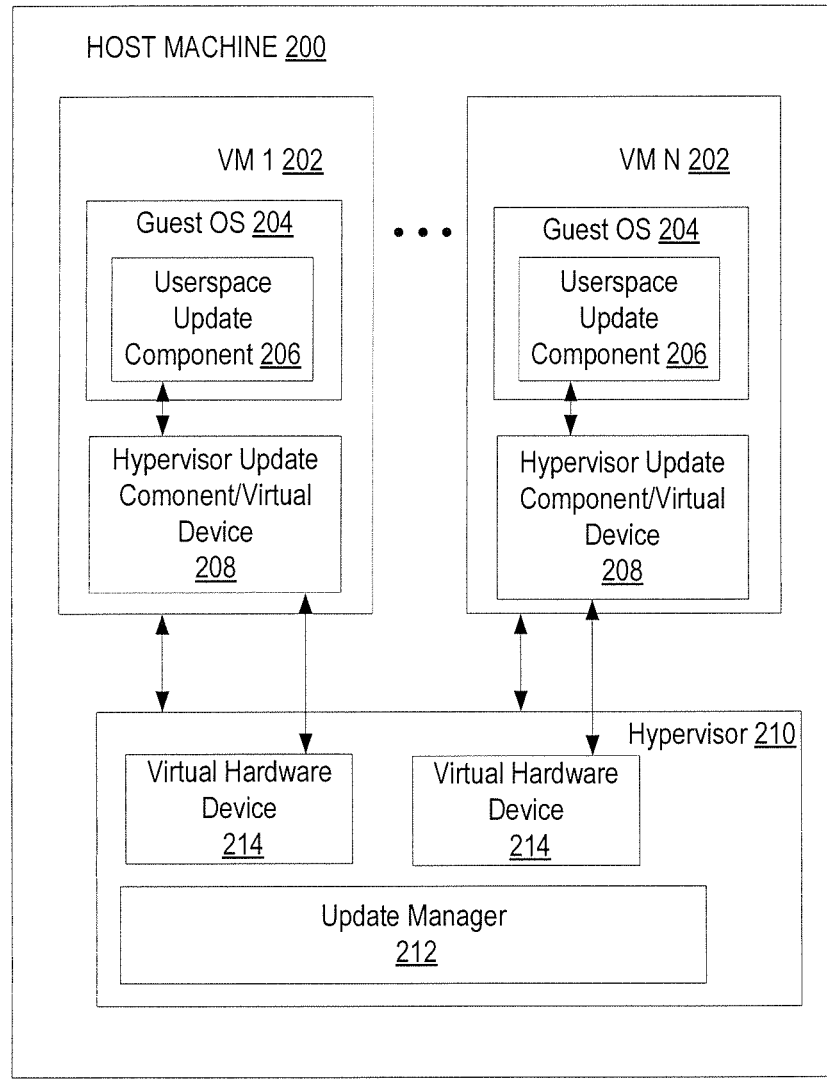
FIG. 2 is a block diagram of one embodiment of a host that may represent a server or a cluster of servers hosting virtual machines (VMs)

FIG. 2 is a block diagram of one embodiment of a host machine 200 that may represent a server or a cluster of servers hosting VMs 202. In one embodiment, host machine 200 is the same as host machine 103 described with respect to FIG. 1. The host machine 200 includes a hypervisor 210 that manages one or more VMs 202. The hypervisor 210 may contain or otherwise control an update manager 212. In one embodiment, update manager 212 is the same as update manager 133 described with respect to FIG. 1.

In embodiments of the invention, the update manager 212 causes the installation of a hypervisor update component 208 in one or more of the VMs 202 managed by the hypervisor 210. In one embodiment, the installation of the hypervisor update component 208 is caused by exposing a virtual hardware device 214 for updates so that the VM OS will automatically install 208. In another embodiment, the installation of the hypervisor update component 208 is caused by hypervisor update component 208 being dynamically or pre-installed by update managers in the host controller and/or VM. In some embodiments, the installation of the hypervisor update component 208 is accomplished through the general mechanism of driving binaries into the VM. 202 In one embodiment, the update manager 212 of the hypervisor 210 may install hypervisor update components 208 on any VMs 202 with a flag indicating they have been selected to obtain hypervisor updates for the hypervisor 210. In one embodiment, the hypervisor update components 208 may be installed upon initialization of the VMs 202. In another embodiment, the update manager 212 may operate on a predetermined schedule to scan all operating VMs 202 to determine whether a hypervisor update component 208 should be installed on the VMs 202.

In one embodiment, the hypervisor update component 208 of the VM 202 operates to make a userspace update component 206 of the guest OS 204 of the VM 202 aware of the hypervisor components used in hypervisor 210, and thereby enabling the userspace update component 206 to obtain updates for those components of the hypervisor 210. Once the update component 206 has obtained any necessary hypervisor updates, they are passed to the hypervisor update manager 212, or to the hypervisor itself 210, from the guest OS 204 or from the hypervisor update agent 208 of the VM 202 through a dedicated channel existing between the VM 202 and the hypervisor 210 specifically for communications between the two.

In another embodiment, the hypervisor 210 presents a virtual hardware device 208 that is virtualized on the VM 202. Each virtual hardware device 208 has a matching counterpart 214, per VM, located at the hypervisor 210. The virtual hardware device 208 has as its only purpose the goal to obtain hypervisor driver updates from the update service. The updates are device driver code, but they only contain the hypervisor updates. Once the updates are received by the VMs 202, the VM OS 204 installs them as a new driver, shown as update component 206, in the OS 204. Upon installation (and boot), the driver 206 sends the accepted update code to the hypervisor update manager 212 via an established channel between the VM 202 and the hypervisor 210.

Figure 3:
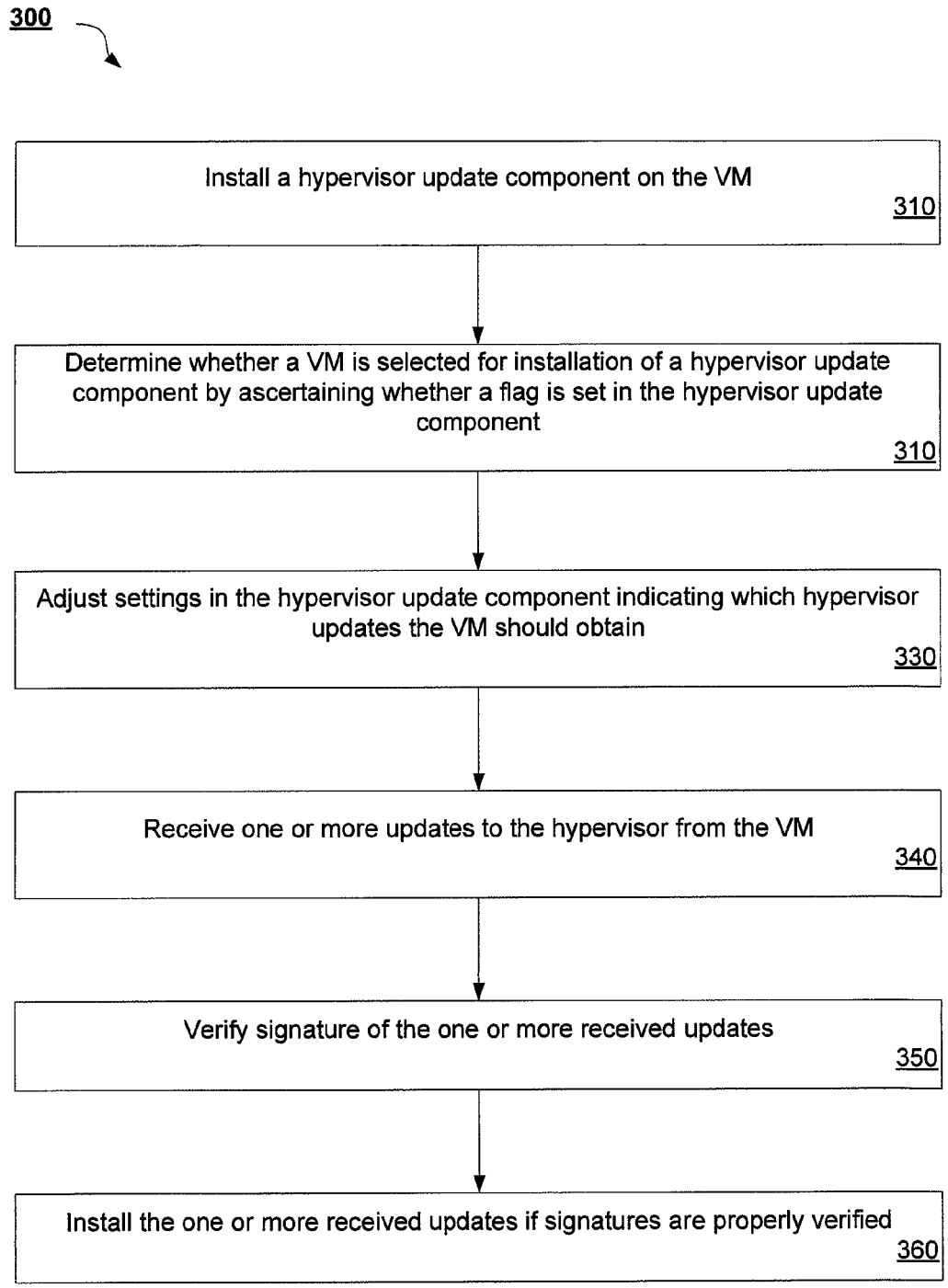
FIG. 3 is a flow diagram illustrating a method performed by a hypervisor for obtaining hypervisor updates using existing VM-to-host channels according to an embodiment of the invention.

FIG. 3 is a flow diagram illustrating a method 300 performed by a hypervisor for obtaining hypervisor updates using existing VM-to-host channels according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by host machine 103, and specifically hypervisor 132, of FIG. 1.

Method 300 begins at block 310 where a hypervisor update component is installed on the VM. At block 320, it is determined whether the VM is selected for obtaining hypervisor updates via the hypervisor update component. In one embodiment, a flag may be shown to the VM OS by a read-only parameter exposed by the hypervisor update component upon initiation of the VM, indicating that the VM has been selected to obtain updates for the hypervisor. If the flag is not set, then the hypervisor is prevented from accessing the hypervisor update component by the VM changing a register value in the hypervisor update component. In some embodiments, the VM may be deemed as particularly compatible and/or secure with respect to the hypervisor. In other embodiments of the invention, a VM may already include the hypervisor update component, thus rendering blocks 310 and 320 moot. If the hypervisor update component is already included on a VM, then method 300 may begin at block 330.

Subsequently, at block 330, any settings in the hypervisor update component are adjusted as determined by an update manager of the hypervisor. In one embodiment, these settings may include an identification of the type and version of the hypervisor. In other embodiments, the settings may directly indicate which updates the hypervisor wishes to receive. Then, at block 340, hypervisor updates are received from the VM through the update device. In embodiments of the invention, these hypervisor updates are received over a dedicated channel previously established between the hypervisor and the VM.

At block 350, digital signatures of the hypervisor updates are verified for authenticity. In one embodiment, a digital signature of the update is checked against a digital signature known at the hypervisor to determine authenticity. One skilled in the art will appreciate that there a variety of techniques to determine authenticity of the updates and any of these may be utilized in embodiments of the invention. Then, at block 360, if the digital signatures are verified as authentic, then the hypervisor updates are installed on the hypervisor.

Figure 4:
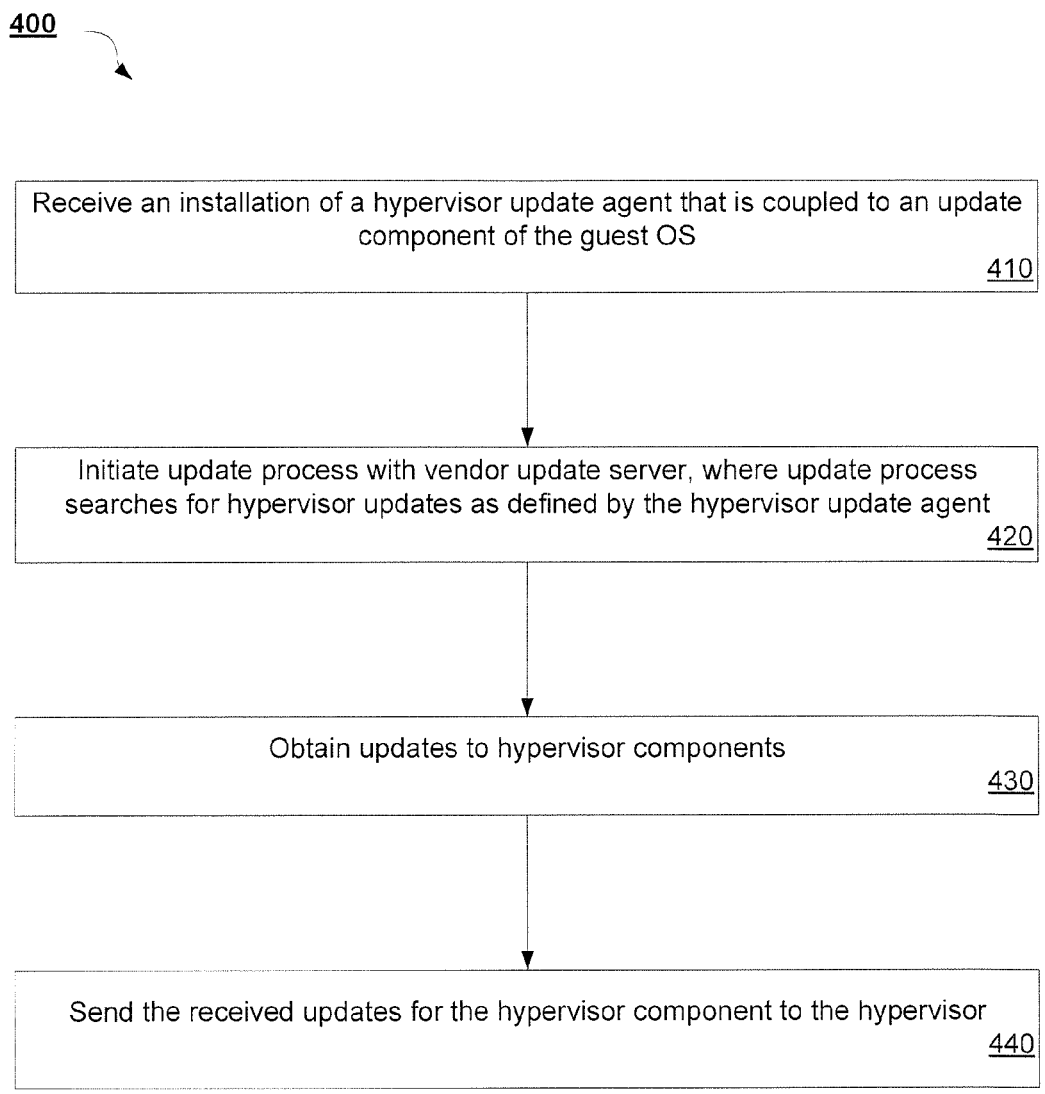
FIG. 4 is a flow diagram illustrating a method performed by a VM for downloading hypervisor updates using existing VM-to-host channels according to an embodiment of the invention.

FIG. 4 is a flow diagram illustrating a method 400 performed by a VM for downloading hypervisor updates using existing VM-to-host channels according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by VM 202 of FIG. 2.

Method 400 begins at block 410 where a hypervisor update component is installed in the VM. The hypervisor update component is communicably coupled to an update component of the OS of the VM. In other embodiments of the invention, OS contacts the hypervisor vendor site directly for the update. In one embodiment, the hypervisor update component makes the update component of the VM OS aware of hypervisor components that should receive updates from a vendor update server. In other embodiments, the hypervisor provides a virtual hardware device to the VM that causes the VM OS to think that a hypervisor update is a device driver that the OS needs. In this way, the content of the update will be transparent from the OS vendor.

At block 420, an update process is initiated with the vendor update server. The update process is performed by the update component of the VM OS and, as part of the process, searches for hypervisor updates as defined by the installed hypervisor update component. In one embodiment, the hypervisor update agents may be installed upon initialization of the VMs. In another embodiment, the update manager registers itself through the device driver to the hypervisor. Thus, the hypervisor maintains a list of VMs with available update agents. Note that the VM OS itself might schedule an update check for any of its components, among them, the hypervisor code that is embedded within a virtual dummy device.

Subsequently, at block 430, any updates for the hypervisor components found in block 420 are obtained at the VM. Then, these received updates are sent to the hypervisor itself from the VM at block 440. In one embodiment, the hypervisor update either passes through a VM channel (a communication mechanism between the guest and the host) or via the dummy update device itself that is used for that purpose. In the latter case, the dummy update device has ring buffer, shared between the hypervisor and the VM, that is used to pass binary messages.

Figure 5:
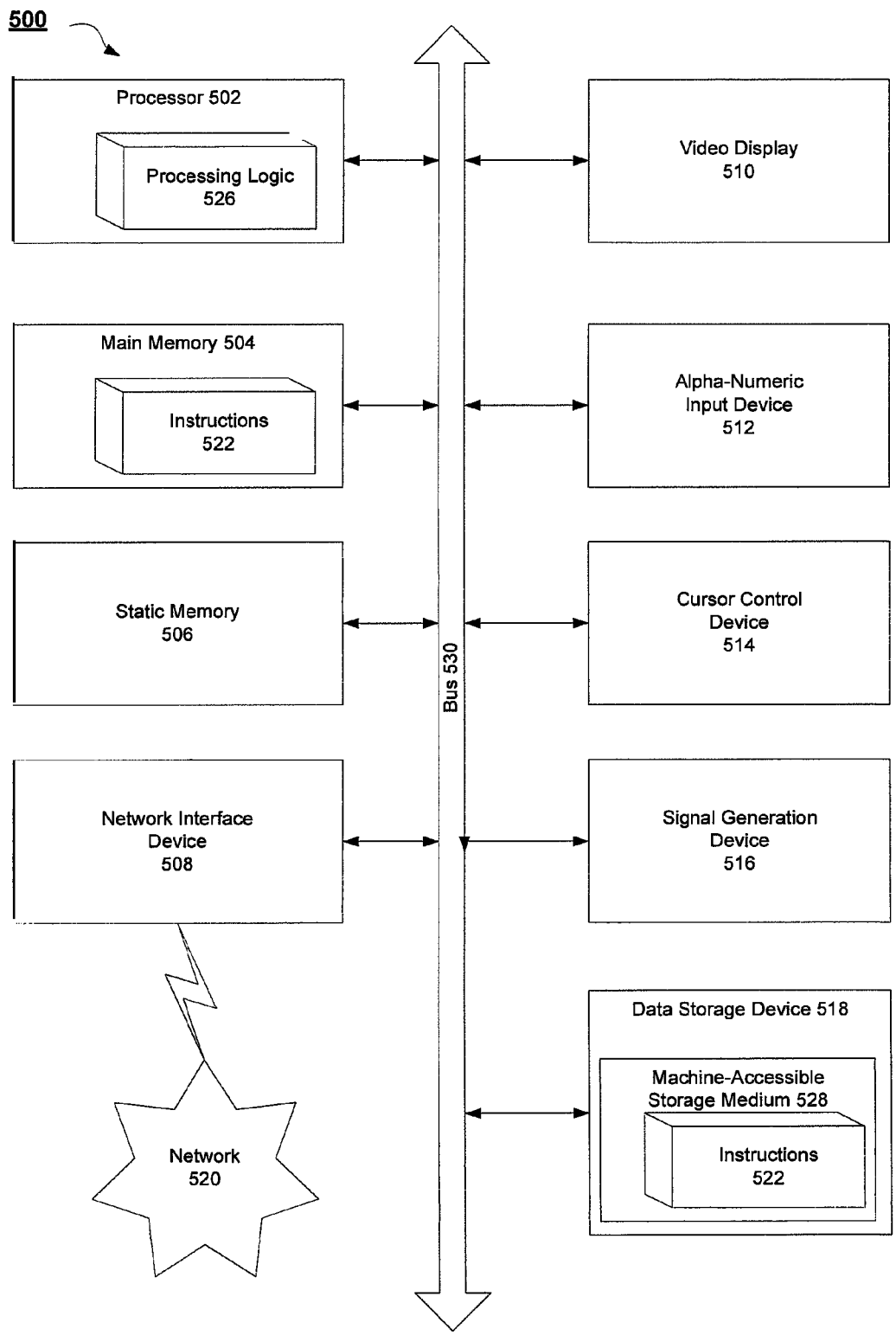
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to perform downloading hypervisor updates using existing VM-to-host channels by host machine 103 described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to stored instructions to perform methods 300 and 400 for downloading hypervisor updates using existing VM-to-host channels described with respect to FIGS. 3 and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
installing, by a hypervisor of a host machine, a virtual hardware device on a virtual machine (VM) managed by the hypervisor, the virtual hardware device to communicate with a userspace update component of the operating system (OS) of the VM to obtain updates to the hypervisor;
adjusting, by the hypervisor, settings in the VM virtual hardware device to indicate a current version of the hypervisor;
receiving, by the hypervisor from the virtual hardware device, a hypervisor update via a driver update to the virtual hardware device, wherein the hypervisor update comprises device driver code update to the virtual hardware device;
verifying, by the hypervisor, that the received hypervisor update is valid; and
when the received hypervisor update is verified as valid, installing, by the hypervisor, the received hypervisor update.

2. The method of claim 1, wherein the hypervisor does not have an external connection to a network that comprises an update server providing the hypervisor update, while the VM does have an external connection to the network.

3. The method of claim 2, wherein the virtual hardware device is communicably coupled to an update component of the OS of the VM, the update component of the OS to communicate with the update server to obtain the hypervisor update.

4. The method of claim 1, wherein the VM is marked upon its initialization to receive the virtual hardware device.

5. The method of claim 1, wherein the VM obtains the hypervisor update based on the adjusted settings in the virtual hardware device so that the hypervisor update does not comprise updates to versions of the hypervisor older than the current version of the hypervisor.

6. The method of claim 1, wherein the VM is indicated as a trusted VM based on components of the VM and user privilege settings of the VM.

7. The method of claim 1, wherein the virtual hardware device is emulated on the VM and wherein the driver update to the virtual hardware device is the same as the hypervisor update.

8. A system, comprising:
a processing device;
a memory communicably coupled to the processing device; and
a virtual machine (VM) executed from the memory and sharing use of the processing device, the VM to:
execute a virtual hardware device on the VM, the virtual hardware device to communicate with a userspace update component of the operating system (OS) of the VM to obtain updates to the hypervisor;
adjust settings in the VM virtual hardware device to indicate a current version of the hypervisor;
initiate an update process with a vendor update server utilizing the virtual hardware device;
obtain a hypervisor update via a driver update to the virtual hardware device from the vendor update server, wherein the hypervisor update comprises device driver code update to the virtual hardware device; and
send the obtained hypervisor update to the hypervisor, wherein the hypervisor verifies that the received hypervisor update is valid and, upon validation, installs the received hypervisor update.

9. The system of claim 8, wherein the hypervisor does not have an external connection to a network that comprises the vendor update server providing the hypervisor update, while the VM does have an external connection to the network.

10. The system of claim 9, wherein the virtual hardware device is communicably coupled to an update component of a OS of the VM, the update component of the OS to communicate with the vendor update server to obtain the hypervisor update.

11. The system of claim 8, wherein the VM is marked upon its initialization to receive the virtual hardware device.

12. The system of claim 8, wherein the settings of the virtual hardware device are adjusted in order to indicate a current version of the hypervisor so that the hypervisor update obtained by the VM does not comprise updates to versions of the hypervisor older than the current version of the hypervisor.

13. The system of claim 8, wherein the VM is indicated as a trusted VM based on components of the VM and user privilege settings of the VM.

14. The system of claim 8, wherein the virtual hardware device emulated on the VM and wherein the driver update is the same as the hypervisor update.

15. A non-transitory machine-readable storage medium including data that, when accessed by a machine, cause the machine to perform operations comprising:
installing, by a hypervisor of the machine, a virtual hardware device on a virtual machine (VM) managed by the hypervisor, the virtual hardware device to communicate with a userspace update component of the operating system (OS) of the VM to obtain updates to the hypervisor;

adjusting, by the hypervisor, settings in the VM virtual hardware device to indicate a current version of the hypervisor;

receiving, by the hypervisor from the virtual hardware device, a hypervisor update via a driver update to the virtual hardware device, wherein the hypervisor update comprises device driver code update to the virtual hardware device;

verifying, by the hypervisor, that the received hypervisor update is valid; and when the received hypervisor update is verified as valid, installing, by the hypervisor, the received hypervisor update.

16. The non-transitory machine-readable storage medium of claim 15, wherein the hypervisor does not have an external connection to a network that comprises an update server providing the hypervisor update to the hypervisor, while the VM does have an external connection to the network.

17. The non-transitory machine-readable storage medium of claim 16, wherein the virtual hardware device is communicably coupled to an update component of the OS of the VM, the update component of the OS to communicate with the update server to obtain the hypervisor update.

18. The non-transitory machine-readable storage medium of claim 15, wherein the virtual hardware device is emulated on the VM and wherein the driver update is the same as the hypervisor update.

19. The non-transitory machine-readable storage medium of claim 15, wherein the VM is marked upon its initialization to receive the virtual hardware device.

20. The non-transitory machine-readable storage medium of claim 15, wherein the VM obtains the hypervisor update based on the adjusted settings in the virtual hardware device so that the hypervisor update does not comprise updates to versions of the hypervisor older than the current version of the hypervisor.

* * * * *